United States Patent
Gao et al.

(10) Patent No.: US 6,710,143 B2
(45) Date of Patent: Mar. 23, 2004

(54) SUPPORTED PHOSPHINIMINE POLYMERIZATION CATALYST

(75) Inventors: Xiaoliang Gao, Calgary (CA); P. Scott Chisholm, Calgary (CA); Robert D. Donaldson, Airdrie (CA); Ian McKay, Calgary (CA)

(73) Assignee: Nova Chemicals (International) S.A. (CH)

( * ) Notice: Subject to any disclaimer, the term of this patent is extended or adjusted under 35 U.S.C. 154(b) by 0 days.

(21) Appl. No.: 10/244,194

(22) Filed: Sep. 16, 2002

(65) Prior Publication Data

US 2003/0119661 A1 Jun. 26, 2003

(30) Foreign Application Priority Data

Sep. 17, 2001 (CA) ............................................. 2357385

(51) Int. Cl.[7] .............................. C08F 4/64; B01J 31/12
(52) U.S. Cl. ....................... 526/161; 502/119; 502/120; 502/155; 526/160; 526/165; 526/129; 526/943
(58) Field of Search ................................. 502/119, 120, 502/155, 160; 526/161, 165, 129, 943

(56) References Cited

U.S. PATENT DOCUMENTS

| | | | |
|---|---|---|---|
| 4,100,337 A | 7/1978 | Noshay et al. | 526/130 |
| 4,536,484 A | 8/1985 | Lacombe et al. | 502/62 |
| 5,219,817 A | 6/1993 | McDaniel et al. | 502/228 |
| 5,219,962 A | 6/1993 | McDaniel et al. | 526/126 |
| 5,221,654 A | 6/1993 | McDaniel et al. | 502/228 |
| 5,221,655 A | 6/1993 | McDaniel et al. | 502/228 |
| 5,221,720 A | 6/1993 | McDaniel et al. | 526/135 |
| 5,965,677 A * | 10/1999 | Stephan et al. | |

FOREIGN PATENT DOCUMENTS

EP 0 906 920 A1 4/1999

* cited by examiner

Primary Examiner—Caixia Lu
(74) Attorney, Agent, or Firm—Kenneth H. Johnson

(57) ABSTRACT

A phosphinimine catalyst for olefin polymerization is supported on a directly fluorided metal oxide with an aluminoxane. This catalyst is highly active for olefin polymerization in comparison to prior art catalysts which use non-fluorided metal oxide supports. The directly fluorided metal oxide may be conveniently prepared by contacting the precursor metal oxide with a simple alkali metal salt (such as NaF) in an aqueous slurry.

9 Claims, No Drawings

SUPPORTED PHOSPHINIMINE POLYMERIZATION CATALYST

FIELD OF THE INVENTION

This invention relates to catalyst systems for olefin polymerizations.

BACKGROUND OF THE INVENTION

The use of fluorided alumina as a support material for Phillips-type chromium polymerization catalysts has been widely disclosed in the patent literature. The following U.S. Pat. Nos. (USP) relate to this technology: 5,221,720; 5,221,655; 5,221,654; 5,219,962; and 5,219,817 (all McDaniel et al, and all assigned to Phillips Petroleum Company). Similarly U.S. Pat. No. 4,100,337 (Noshay et al, assigned to Union Carbide Corporation) teaches the use of fluorided silica supports for chromium polymerization catalysts.

Halogenated catalyst supports are also known for use with other types of ethylene polymerization catalysts. For example, U.S. Pat. No. 4,536,484 (Lacombe et al, assigned to Atochem) teaches the preparation of a functionalized support (by the reaction of an organoaluminum compound with a functionalized magnesium compound) followed by the chlorination of the functionalized support. The resulting support is used with a Ziegler-Natta type catalyst and an aluminoxane cocatalyst.

Similarly, European patent application EP 906,920 (Saudemont et al, assigned to Elf Atochem) teaches the preparation of a functionalized support, followed by the fluorination of the functionalized support. The resulting support material allows the use of aluminum alkyls as active cocatalysts for metallocene catalysts. This is a desirable result as aluminum alkyls are less expensive than aluminoxanes. However, EP 906,920 also shows that directly fluorided supports (where "directly fluorided" refers to supports which were not functionalized before being treated with a source of fluorine) do not provide catalytic activity when used with aluminum alkyls (see comparative example 25 of the '920 application).

In contrast, we have now discovered that of a directly fluorided metal oxide provides an excellent support for a phosphinimine/aluminum olefin polymerization catalyst.

SUMMARY OF THE INVENTION

In one embodiment, the present invention provides a supported catalyst system for olefin polymerization comprising:

a) a directly fluorided metal oxide;

b) an aluminoxane; and c) a catalyst which is a complex of a group 4 metal having at least one phosphinimine ligand.

The present invention also provides a process to prepare polyolefins using the catalyst technology of this invention.

DETAILED DESCRIPTION

The use of metal oxide supports in the preparation of olefin polymerization catalysts is known to those skilled in the art. An exemplary list of suitable metal oxides includes oxides of aluminum, silicon, zirconium, zinc and titanium. Alumina, silica and silica-alumina are metal oxides which are well known for use in olefin polymerization catalysts and are preferred for reasons of cost and convenience. Silica is particularly preferred.

It is preferred that the metal oxide have a particle size of from about 1 to about 200 microns. It is especially preferred that the particle size be between about 30 and 100 microns if the catalyst is to be used in a gas phase or slurry polymerization process and that a smaller particle size (less than 10 microns) be used if the catalyst is used in a solution polymerization.

Conventional porous metal oxides which have comparatively high surface areas (greater than 1 $m^2/g$, particularly greater than 100 $m^2/g$, more particularly greater than 200 $m^2/g$) are preferred to non-porous metal oxides.

The "directly fluorided" metal oxides used in this invention are prepared by directly treating the metal oxide with a source of fluoride. [By way of clarification, the present invention does not encompass the use of "functionalized supports" which are taught in the aforementioned U.S. Pat. No. 4,536,484 and/or EP 906,920. In other words, the present invention eliminates the need for the pretreatment/functionalization which is required by the cited prior art.]

The term "directly fluorided" is meant to broadly refer to the treatment of the metal oxide with a source of fluoride. Any inorganic or organic fluorine containing material which provides fluoride may be used. A review of these materials is given in the aforementioned U.S. Pat. No. 4,100,337 and the references cited therein. Exemplary sources of fluoride include HF, ammonium fluorides (such as $NH_4HF_2$ $NH_4BF_4$, $(NH_4)_2SiF_6$) and alkali metal fluorides such as LiF, KF and NaF. The use of inorganic fluorides is preferred. The use of NaF is especially preferred. Conventional techniques to prepare the fluorided metal oxide may be used (as disclosed in the previously mentioned references). However, in a particular preferred embodiment of this invention, silica is simply contacted with an aqueous solution of fluoride at an acidic pH (as described further in the Examples). This is an inexpensive and convenient process with the further advantage that it does not produce waste byproducts which are expensive to handle or dispose of.

The amount of fluoridation agent present in the liquid is preferably from 0.1 to 20 weight % based on the weight of the silica. Alcohols or an aqueous alcohol solution may also be used in place of the water as the contacting liquid. Preferred contacting conditions include times from about 1 minute to about 3 days (especially from about 10 minutes to about 3 hours) at a temperature of from about 10° C. to 200° C. (under pressure) with particularly preferred temperatures being from about 20° C. to 80° C. After contacting the silica and sodium fluoride, the fluorided silica is removed from the liquid and preferably calcined prior to treatment with the aluminoxane.

Conventional calcining conditions may be employed—i.e. calcining temperatures of from about 150° C. to about 900° C. for periods of time ranging from about 10 minutes to about 48 hours. Preferred calcining conditions include temperatures of from 200° C. to 700° C. for times of from 1 to 8 hours.

The directly fluorided metal oxide used in this invention preferably has a fluorine content of from 0.01 to 15 weight % based upon the weight of the fluorine and metal oxide.

The fluorided metal oxide is preferably first contacted with an aluminoxane.

Aluminoxanes are readily available items of commerce which are known to be cocatalysts for olefin polymerization catalysts (especially group 4 metal metallocene catalysts). A generally accepted formula to represent aluminoxanes is:

wherein each R is independently an alkyl group having from 1 to 6 carbon atoms and m is between 0 and about 50. The preferred aluminoxane is methylaluminoxane wherein R is predominantly methyl. Commercially available methylaluminoxane ("MAO") and "modified MAO" are preferred for use in this invention. [Note: In modified MAO, the R groups of the above formula are predominantly methyl but a small fraction of the R groups are higher hydrocarbyls—such as ethyl or butyl—so as to improve the solubility of the "modified MAO" in aliphatic solvents.]

The directly fluorided metal oxide and aluminoxane are preferably contacted together using conventional techniques to prepare supported catalysts such as mixing the aluminoxane and fluorided metal oxide together in a linear or aromatic hydrocarbon (such as hexane or toluene) at a temperature of from 10 to 200° C. for a time of from 1 minute to several hours. The amount of aluminoxane is preferably sufficient to provide from 1 to 40 weight % aluminoxane (based on the combined weight of the aluminoxane and the fluorided metal oxide). The intermediate product which is produced by these steps is a "supported aluminoxane" catalyst component. A catalyst molecule is then deposited on the supported aluminoxane. The catalyst molecule is a complex of a group 4 metal which is characterized by having at lease one phosphinimine ligand. Preferred catalyst are defined by the formula:

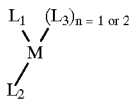

wherein M is selected from titanium, hafnium and zirconium, $L_1$ is a phosphinimine ligand; $L_2$ is a ligand selected from the group consisting of a phosphinimine ligand, a cyclopentadienyl ligand which may optionally be substituted and heteroatom ligands; and $L_3$ is an activatable ligand. It is preferred but n=2 (i.e. that there are two monoanionic activatable ligands). It is preferred that the metal M is titanium in the highest transition state (i.e. $Ti4^+$). Detailed description of ligands $L_1$, $L_2$ and $L_3$ are provided later.

It should also be noted that preferred catalyst systems according to this inventor are characterized by having a molar Al:M ratio (where Al represents the aluminum contained in the aluminoxane and M represents the group 4 metal) of from 10:1 to 200:1, especially from 50:1 to 150:1.

The catalyst component (i.e. the fluorided metal oxide/aluminoxane) may be combined with the polymerization catalyst using techniques which are conventionally used to prepare supported aluminoxane/metallocene catalysts. Such techniques are well known to those skilled in the art. In general, a hydrocarbon slurry of the catalyst component may be contacted with the catalyst complex. It is preferred to use a hydrocarbon in which the catalyst complex is soluble. The examples illustrate suitable techniques to prepare the "catalyst systems" of this invention.

Description of Ligands $L_1$ is a phosphinimine ligand (see A.1 below). $L_2$ may be a phosphinimine ligand (see A.1), or a cyclopentadienyl ligand (see A.2), or a heteroatom ligand, (including a ketimide ligand, or a siloxy ligand, or an amido ligand, or an alkoxy ligand, or a boron heterocyclic ligand or a phosphole ligand (see part A.3.1 to A.3.6 below). Each $L_3$ is an activatable ligand as described in Part A.4.

A. 1 Phosphinimine Ligand

Phosphinimine ligands are defined by the formula:

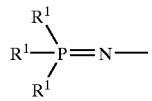

wherein each $R^1$ is independently selected from the group consisting of a hydrogen atom, a halogen atom, $C_{1-20}$ hydrocarbyl radicals which are unsubstituted by or further substituted by a halogen atom, a $C_{1-8}$ alkoxy radical, a $C_{6-10}$ aryl or aryloxy radical, an amido radical, a silyl radical of the formula:

wherein each $R^2$ is independently selected from the group consisting of hydrogen, a $C_{1-8}$ alkyl or alkoxy radical, $C_{6-10}$ aryl or aryloxy radicals, and a germanyl radical of the formula:

wherein $R^2$ is as defined above.

The preferred phosphinimines are those in which each $R^1$ is a hydrocarbyl radical. A particularly preferred phosphinimine is tri-(tertiary butyl) phosphinimine (i.e. where each $R^1$ is a tertiary butyl group).

A.2 Cyclopentadienyl Ligands $L_2$ may be a cyclopentadienyl ligand. As used herein, the term cyclopentadienyl ligand is meant to convey its broad meaning, namely a substituted or unsubstituted ligand having a five carbon ring which is bonded to the metal via eta-5 bonding. Thus, the term cyclopentadienyl includes unsubstituted cyclopentadienyl, substituted cyclopentadienyl, unsubstituted indenyl, substituted indenyl, unsubstituted fluorenyl and substituted fluorenyl. An exemplary list of substituents for a cyclopentadienyl ligand includes the group consisting of $C_{1-10}$ hydrocarbyl radical (which hydrocarbyl substituents are unsubstituted or further substituted); a halogen atom, $C_{1-8}$ alkoxy radical, a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si—$(R^1)_3$ wherein each $R^1$ is independently selected from the group consisting of hydrogen, a $C_{1-8}$ alkyl or alkoxy radical $C_{6-10}$ aryl or aryloxy radicals; germanyl radicals of the formula Ge—$(R^1)_3$ wherein $R^1$ is as defined directly above.

It is preferred that $L_2$ is cyclopentadienyl (optionally substituted) as illustrated in the examples.

A. 3 Heteroatom Ligands

As used herein, the term heteroatom ligand refers to a ligand which contains a heteroatom selected from the group consisting of nitrogen, boron, oxygen, phosphorus and sulfur. The ligand may be sigma or pi bonded to the metal. Exemplary heteroatom ligands include ketimide ligands, siloxy ligands amido ligands, alkoxy ligands, boron heterocyclic ligands and phosphole ligands. Brief descriptions of such ligands follow.

Phosphole ligands are also well known to those skilled in the art of olefin polymerization and are described as such in U.S. Pat. No. 5,434,116 (Sone, to Tosoh).

A.3.1 Ketimide Ligands

As used herein, the term "ketimide ligand" refers to a ligand which:

(a) is bonded to the group 4 metal via a metal-nitrogen atom bond;

(b) has a single substituent on the nitrogen atom, (where this single substituent is a carbon atom which is doubly bonded to the N atom); and (c) has two substituents (Sub 1 and Sub 2, described below) which are bonded to the carbon atom.

Conditions a, b, and c are illustrated below:

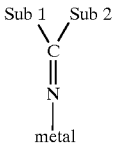

The substituents "Sub 1" and "Sub 2" may be the same or different. Exemplary substituents include hydrocarbyls having from 1 to 20 carbon atoms; silyl groups, amido groups and phosphido groups. For reasons of cost and convenience it is preferred that these substituents both be hydrocarbyls, especially simple alkyls and most preferably tertiary butyl.

A.3.2 Siloxy Heteroligands

These ligands are defined by the formula:

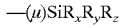

$$—(\mu)SiR_xR_yR_z$$

where the—denotes a bond to the transition metal and p is sulfur or oxygen.

The substituents on the Si atom, namely $R_x$, $R_y$ and $R_z$ are required in order to satisfy the bonding orbital of the Si atom. The use of any particular substituent $R_x$, $R_y$ or $R_z$ is not especially important to the success of this invention. It is preferred that each of $R_x$, $R_y$ and $R_z$ is a $C_{1-4}$ hydrocarbyl group such as methyl, ethyl, isopropyl or tertiary butyl (simply because such materials are readily synthesized from commercially available materials).

A.3.3 Amino Ligands

The term "amido" is meant to convey its broad, conventional meaning. Thus, these ligands are characterized by (a) a metal-nitrogen bond, and (b) the presence of two substituents (which are typically simple alkyl or silyl groups) on the nitrogen atom.

A.3.4 Alkoxy Ligands

The term "alkoxy" is also intended to convey its conventional meaning. Thus these ligands are characterized by (a) a metal oxygen bond, and (b) the presence of a hydrocarbyl group bonded to the oxygen atom. The hydrocarbyl group may be a ring structure and/or substituted (e.g. 2,6 di-tertiary butyl phenoxy).

A.3.5 Boron Heterocyclic Ligands

These ligands are characterized by the presence of a boron atom in a closed ring ligand. This definition includes heterocyclic ligands which also contain a nitrogen atom in the ring. These ligands are well known to those skilled in the art of olefin polymerization and are fully described in the literature (see, for example, U.S. Pat. Nos. 5,637,659; 5,554,775 and the references cited therein).

A.3.6 Phosphole Ligands

The term "phosphole" is also meant to convey its conventional meaning. "Phosphole" is also meant to convey its conventional meaning. "Phospholes" are cyclic dienyl structures having four carbon atoms and one phosphorus atom in the closed ring. The simplest phosphole is $C_4PH_4$ (which is analogous to cyclopentadiene with one carbon in the ring being replaced by phosphorus). The phosphole ligands may be substituted with, for example, $C_{1-20}$ hydrocarbyl radicals (which may, optionally, contain halogen substituents); phosphido radicals; amido radicals; silyl or alkoxy radicals.

A.4 Activatable Ligand

Each $L_3$ is an activatable ligand. The term "activatable ligand" refers to a ligand which may be activated by a cocatalyst or "activator" (i.e. the aluminoxane) to facilitate olefin polymerization. Exemplary activatable ligands are independently selected from the group consisting of a hydrogen atom, a halogen atom, a $C_{1-10}$ hydrocarbyl radical, a $C_{1-10}$ alkoxy radical, a $C_{5-10}$ aryl oxide radical; each of which said hydrocarbyl, alkoxy, and aryl oxide radicals may be unsubstituted by or further substituted by a halogen atom, a $C_{1-8}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals; a phosphido radical which is unsubstituted or substituted by up to two $C_{1-8}$ alkyl radicals.

The number of activatable ligands depends upon the valency of the metal and the valency of the activatable ligand. As previously noted, the preferred catalysts contain a group 4 metal in the highest oxidation state (i.e. $4^+$) and the preferred activatable ligands are monoanionic (such as a halide—especially chloride, or an alkyl—especially methyl). Thus, the preferred catalyst contains two activatable ligands. In some instances, the metal of the catalyst component may not be in the highest oxidation state. For example, a titanium (Ill) component would contain only one monoanionic activatable ligand. Also, it is permitted to use a dianionic activatable ligand although this is not preferred.

Polymerization Processes

The catalyst system of this meter is suitable for use in any conventional olefin polymerization process, such as the so-called "gas phase", "slurry", "high pressure" or "solution" polymerization processes. Polyethylene, polypropylene and ethylene propylene elastomers are examples of olefin polymers which may be produced according to this invention.

The preferred polymerization process according to this invention uses ethylene and may include other monomers which are copolymerizable therewith such as other alpha olefins (having from three to ten carbon atoms, preferably butene, hexene or octene) and, under certain conditions, dienes such as hexadiene isomers, vinyl aromatic monomers such as styrene or cyclic olefin monomers such as norbornene.

The present invention may also be used to prepare elastomeric co- and terpolymers of ethylene, propylene and optionally one or more diene monomers. Generally, such elastomeric polymers will contain about 50 to abut 75 weight % ethylene, preferably about 50 to 60 weight % ethylene and correspondingly from 50 to 25% of propylene. A portion of the monomers, typically the propylene monomer, may be replaced by a conjugated diolefin. The diolefin may be present in amounts up to 10 weight % of the polymer although typically is present in amounts from about 3 to 5 weight %. The resulting polymer may have a composition comprising from 40 to 75 weight % of ethylene, from 50 to 15 weight % of propylene and up to 10 weight % of a diene monomer to provide 100 weight % of the polymer. Preferred but not limiting examples of the dienes are dicyclopentadiene, 1,4-hexadiene, 5-methylene-2-norbornene, 5-ethylidene-2-norbornene and 5-vinyl-2-norbornene. Particularly preferred dienes are 5-ethylidene-2-norbornene and 1,4-hexadiene.

The polyethylene polymers which may be prepared in accordance with the present invention typically comprise not less than 60, preferably not less than 70 weight % of ethylene and the balance one or more $C_{4-10}$ alpha olefins, preferably selected from the group consisting of 1-butene, 1-hexene and 1-octene. The polyethylene prepared in accordance with the present invention may be linear low density polyethylene having density from about 0.910 to 0.935 g/cc. The present invention might also be useful to prepare polyethylene having a density below 0.910 g/cc—the so-called very low and ultra low density polyethylenes.

The catalyst system of this invention is preferably used in a slurry polymerization process or a gas phase polymerization process.

The typical slurry polymerization process uses total reactor pressures of up to about 50 bars and reactor temperature of up to about 200° C. The process employs a liquid medium (e.g. an aromatic such as toluene or an alkane such as hexane, propane or isobutane) in which the polymerization takes place. This results in a suspension of solid polymer particles in the medium. Loop reactors are widely used in slurry processes. Detailed descriptions of slurry polymerization processes are widely reported in the open and patent literature.

In general, a fluidized bed gas phase polymerization reactor employs a "bed" of polymer and catalyst which is fluidized by a flow of monomer which is at least partially gaseous. Heat is generated by the enthalpy of polymerization of the monomer flowing through the bed. Unreacted monomer exits the fluidized bed and is contacted with a cooling system to remove this heat. The cooled monomer is then re-circulated through the polymerization zone together with "make-up" monomer to replace that which was polymerized on the previous pass. As will be appreciated by those skilled in the art, the "fluidized" nature of the polymerization bed helps to evenly distribute/mix the heat of reaction and thereby minimize the formation of localized temperature gradients (or "hot spots"). Nonetheless, it is essential that the heat of reaction be properly removed so as to avoid softening or melting of the polymer (and the resultant-and highly undesirable—"reactor chunks"). The obvious way to maintain good mixing and cooling is to have a very high monomer flow through the bed. However, extremely high monomer flow causes undesirable polymer entrainment.

An alternative (and preferable) approach to high monomer flow is the use of an inert condensable fluid which will boil in the fluidized bed (when exposed to the enthalpy of polymerization), then exit the fluidized bed as a gas, then come into contact with a cooling element which. condenses the inert fluid. The condensed, cooled fluid is then returned to the polymerization zone and the boiling/condensing cycle is repeated.

The above-described use of a condensable fluid additive in a gas phase polymerization is often referred to by those skilled in the art as "condensed mode operation" and is described in additional detail in U.S. Pat. Nos. 4,543,399 and 5,352,749. As noted in the '399 reference, it is permissible to use alkanes such as butane, pentanes or hexanes as the condensable fluid and the amount of such condensed fluid preferably does not exceed about 20 weight per cent of the gas phase.

Other reaction conditions for the polymerization of ethylene which are reported in the '399 reference are:
Preferred Polymerization Temperatures: about 75° C. to about 115° C. (with the lower temperatures being preferred for lower melting copolymers—especially those having densities of less than 0.915 g/cc—and the higher temperatures being preferred for higher density copolymers and homopolymers); and
Pressure: up to about 1000 psi (with a preferred range of from about 100 to 350 psi for olefin polymerization).

The '399 reference teaches that the fluidized bed process is well adapted for the preparation of polyethylene but further notes that other monomers may be employed—as is the case in the polymerization process of this invention.

Further details are provided by the following non-limiting examples.

EXAMPLES

Preparation of Fluorided Silica $F-SiO_2$ (1)

NaF (6.30 g, 150 mmol) in 100 ml of distilled water was added slowly to a slurry of silica (a commercially available silica, purchased from W. R. Grace under the tradename "XPO-2408"; 50 g) in distilled water (~350 ml) at room temperature. The slurry was stirred with a magnetic stirrer for 36 hours and HCl (12M, 12.5 ml, 150 mmol) in 100 ml of distilled water was then slowly added. The slurry was warmed to 80° C. and was stirred for 3 days. The slurry was cooled to room temperature, filtered and the silica over the frit was washed with distilled water (3×100 ml). The filtrate was evaporated to dryness and water soluble crystals were collected. An $AgNO_3$ test indicated that the solid contained is mostly NaCl. The fluorided silica was dried in a 135° C. oven over a weekend to remove most of the water. The free flowing fluorided silica was then heated at 200° C. under air for 2 hours and then calcined at 600° C. under nitrogen for 6 hours. The calcined fluorided silica was stored in a glove box for further use. [Note: Scanning Electron Microscopy ("SEM") showed that this batch of fluorided silica was badly fractured (presumably because of the magnetic stirring). Nevertheless, it was used as a support to see qualitatively whether it has any influence on the catalyst performance]. Neutron activation analysis of the fluorided support showed a fluorine (F) content of 2.3 weight %.

$F-SiO_2$ (2)

A similar procedure to the one described above was used but an overhead mechanical stirrer was used to reduce the severity of the mixing (and thereby improve particle morphology). NaF (6.30 g, 150 mmol) in 100 ml of distilled water was added dropwise in one hour period to a slurry of silica (XPO-2408, 50 g) in distilled water (~350 ml) at room temperature while the stirring speed was at 313 rpm. After the addition, the stirring speed was lowered to 250 rpm and the slurry was stirred for 15 hours. The pH value of the slurry was close to 7. HCl (12M, 12.5 ml, 150 mmol) in 100 ml of distilled water was then added dropwise to the slurry. The slurry was heated at 80° C. for 20 hours, cooled to room temperature and was filtered. The solid over the frit was washed with distilled water (2×100ml) and was dried at 70° C. for a weekend and at 135° C. for 24 hours. After the filtrate was evaporated to dryness, 11 g of crystalline solid was collected. Most of this solid was NaCl. The free-flowing fluorided silica (45 g) was then heated at 200° C. for 2 hours under air and calcined at 600° C. for an additional 6 hours under nitrogen. SEM showed that this batch of fluorided silica has good particle morphology. Neutron activation analysis of the fluorided support showed 0.377 weight % F.

$F-SiO2$ (3)

Using the same amounts of reactants as described above, the time of the reaction of NaF with silica was reduced to 5 minutes and then HCl was added to allow the reaction to proceed for another 10 minutes. The slurry was filtered, dried and calcined. Neutron activation analysis of the fluorided support showed 0.13 weight % F.

Preparation of Supported Catalysts
Part 1 Preparation of (F)—Silica/MAO "Catalyst Component"

General procedure: Toluene was deoxygenated and dried (through columns of alumina, deoxo catalyst and activated molecular sieves under nitrogen) prior to use. Unless otherwise specified, the toluene and other solvents (e.g. heptane) are dried and deoxygenated this way. The calcined support material (silica "XPO-2408" or fluorided silica "F-XPO-2408") was weighted into a 100 ml flask and toluene was added to make a slurry. A solution of methyaluminoxane (a commercially available material, sold under the tradename "PMAO-IP" by Akzo Nobel) of 12% weight aluminum was added to the slurry while the slurry was stirred with a minimum stirring speed.

Part 2 Preparation of Supported Catalyst Systems

The catalyst component slurry from Part 1 was stirred for 16 hours and a solution of a catalyst complex (sufficient to provide an Al:Ti or Al:Zr molar ratio of approximately 120:1) was added slowly to the slurry. The titanium catalyst complex used in each experiment is shown in Table 2. The combined mixture was stirred for 2 hours at room temperature and an additional 2 hours at 45° C. The catalyst system solids were recovered by filtration and washed with small amounts of toluene for 3 times and then heptane twice prior to drying under vacuum. The resulting catalyst systems are further described in Table 2. Note: Comparative catalyst systems RB99-80, MT-1097-10-34, and MT-1097-22-68 were prepared in a similar manner but using non-fluorided silica.

Bench Scale Polymerization Operating Conditions
Polymerization Examples 1 to 22

General Procedures: All polymerization work was conducted by using a 2 litre, stirred, autoclave reactor running in a gas phase mode of operation. Polymerizations were conducted at 80 to 90° C. under a total reaction pressure of 200 pounds per square inch gauge ("psig"). A seed bed of dry NaCl (160 g) was used. A specified amount of 25% solution of tri-isobutyl aluminum (TiBAL) was used as a poison scavenger. Some copolymerizations were studied by injecting hexene (5 ml or 10 ml) and/or hydrogen into the reactor.

After the addition of scavenger (and co-monomer), ethylene was used to push the catalyst system into the reactor and to bring the reactor pressure to the total pressure of 200 psig. General polymerization conditions are summarized in Table 1.

TABLE 1

| Bench Scale Operating Conditions | |
|---|---|
| Solvent | 5 mL hexane added with catalyst |
| Operating Mode | Gas Phase |
| Seed Bed | 160 g NaCl |
| Catalyst Charge | Ranges between 10–35 mg |
| Alkyl Scavenger | 25 weight % TiBAL in Hexane (Akzo-Nobel) |

TABLE 1-continued

| Bench Scale Operating Conditions | |
|---|---|
| Al(from alkyl scavenger):M | 250:1 |
| Ethylene | 0.4351–0.5174 molar |
| Hydrogen | 0–0.4 molar |
| Comonomer | 0–0.019 molar Hexene |
| Reaction Pressure | 200 psig |
| Reaction Temperature | 90° C. |
| Reaction Time | 60 minutes |

Some polymers were characterized as described below. Molecular weight data (weight average, or Mw; number average, or Mn; and polydispersity "PD", or Mw/Mn) were determined for some polymers by gel permeation chromatography. The short chain branching distribution of some of the copolymers was determined by Fourier Transform Infra Red Analysis ("FTIR"). Melting points of some polymers were determined by Differential Scanning Calorimetry ("DSC"). Product data are shown in Table 6.

Comparative Polymerization Example 23

A solution of tri isobutyl aluminum ("Al(i-Bu)$_3$") (25.2 weight % in heptane, 4.60 g ) was added to a slurry of F—SiO$_2$(2) (2 g) in toluene. The mixture was stirred for 16 hours. After filtration, the solid was re-slurried in small amount of toluene and the titanium catalyst complex ($^t$Bu$_3$PN)(Indenyl)TiCl$_2$ (0.053 g) in toluene was added to the slurry. The mixture was stirred for 2 hours at 23° C. and then 2 hours at 45° C. After a typical polymerization run, only a trace amount of polymer (less than 5 grams) was collected, thus confirming that aluminoxane is essential to this invention.

Comparative Polymerization Example 24

A blank silica ("XPO-2408") support was made by slurrying 50 g of the silica in water at room temperature with mechanical stirring for 24 hours (without the addition of NaF). To the slurry was added HCl (150 mmol, 12.5 ml). The slurry was stirred for another 24 hours and then filtered. The silica was dried and calcined in the same way as the non-fluorided silica of the comparative catalyst RB99-80. This non-fluorided (but HCl treated) support was then contacted with PMAOI-IP and ($^t$Bu$_3$PN)(Indenyl)TiCl$_2$ (using the conditions previously used to prepare comparative RB99-80—entry 12 in Table 5). A polymerization using this comparative catalyst gave a similar result as the result obtained with comparative catalyst RB99-80 (compare entry 12 with entry 24 in Table 5). The HCl treated support had productivity of 880 g polyethylene per gram of supported catalyst and the more conventional comparative catalyst of entry 12 had a productivity of 736 g polyethylene per gram of supported catalyst). Thus, comparative experiment 24 confirms that the fluorided metal oxide is necessary for the excellent activity of catalyst systems according to this invention.

TABLE 2

(Supported) Catalyst Systems

| Catalyst Code | Formula of Titanium Catalyst Complex | Weight of Complex (g) | Weight of PMAO-IP[a] (g) | Al to Ti Ratio | Support | Weight of Support | Catalyst Loading (mmol/g support) |
|---|---|---|---|---|---|---|---|
| RB99-80 (comparative) | ($^t$Bu$_3$PN)(Indenyl)TiCl$_2$ | 1.073 | 57.14 | 120:1 | SiO$_2$[b] | 50.0 | 0.037 |
| IC974-37-110 | ($^t$Bu$_3$PN)(Indenyl)TiCl$_2$ | 0.119 | 6.586 | 120:1 | F—SiO$_2$(1)[c] | 5.0 | 0.037 |
| CS-1100-3-10 | ($^t$Bu$_3$PN)(Indenyl)TiCl$_2$ | 0.047 | 2.634 | 120:1 | F—SiO$_2$(2)[d] | 2.0 | 0.037 |
| CS-1100-3-11 | ($^t$Bu$_3$PN)(Indenyl)TiCl$_2$ | 0.047 | 2.634 | 120:1 | F—SiO$_2$(2)[d] | 4.0 | 0.0185 |
| MT-1097-10-34 (comparative) | ($^t$Bu$_3$PN)(Cp)TiCl$_2$ | 0.042 | 2.634 | 120:1 | SiO$_2$[b] | 2.0 | 0.037 |
| MT-1097-10-35 | ($^t$Bu$_3$PN)(Cp)TiCl$_2$ | 0.042 | 2.634 | 120:1 | F—SiO$_2$(2)[d] | 2.0 | 0.037 |
| CS-1100-3-09[e] | ($^t$Bu$_3$PN)(Indenyl)TiCl$_2$ | 0.053 | Al(i-Bu)3 only 4.60 g of 25.2 wt % solution | 50:1 | F—SiO$_2$(2)[d] | 2.0 | 0.037 |
| MT-1097-22-68 (comparative) | ($^t$Bu$_3$PN)(Indenyl)TiCl$_2$ | 0.042 | 2.634 | 120:1 | SiO$_2$[b] | 2.0 | 0.037 |

Note:
[a] A commercial PMAO-IP (Akzo Nobel) solution in toluene was used. The aluminum content by weight is about 13 weight % and MAO content is 32% (except for RB99-80 where the Al concentration was about 13.5 weight %).
[b] The silica used is XPO-2408, commercially available from Grace.
[c] This batch of fluorided silica [F—SiO$_2$(1)] was found fractured during the fluoridation process by SEM. The supported catalyst was used only for obtaining preliminary information on catalyst performance.
[d] SEM showed that this batch of fluorided silica has good particle morphology. No fragmentation of the particles were found in the process of fluoridation. After PMAO-IP and the organometallic complex were supported on to the fluorided support, the catalyst was again examined by SEM. The supported catalyst also has good particle morphology.
[e] See procedures for Polymerization Example 23.

Note:
The following abbreviations have been used to describe ligands on the catalysts shown in the tables. Cp = unsubstituted cyclopentadienyl; $^t$Bu$_3$PN = tri(tertiary butyl) phosphinimine; and $^n$BuCp = cyclopentadienyl which is substituted with an n-butyl substituent.

TABLE 3

Polymerization Results

| Run No. | Catalyst Code | Weight of Catalyst (mg) | Hexene (mL) | Hydrogen (psi) | Weight of Polymer (g) | Activity[d] (g.PE/mmolTi.[C2=]) | Productivity[e] (g.PE/g. catalyst) |
|---|---|---|---|---|---|---|---|
| 1 | RB99-80 (comparative) | 32 | 0 | 0 | 24 | 40,194 | 750 |
| 2 | IC974-37-110 | 33 | 0 | 0 | | Too active | Aborted[a] |
| 3 | IC974-37-110 | 14 | 0 | 0 | 50 | 191,404 | 3571[b] |
| 4 | IC974-37-110 | 15 | 0 | 0 | 47 | 167,925 | 3133[b] |
| 5 | IC974-37-110 | 14 | 5 | 0 | 69 | 286,893 | 4928[c] |

Note:
[a] The run was too hot (active) to properly control.
[b],[c] Although the amount of catalyst used was decreased to 14 mg or 15 mg, there was still 20 to 25° C. temperature excursion in the beginning of the run.
[d] Activity is expressed as grams of polyethylene per millimole titanium · atmosphere ethylene.
[e] Productivity is expressed as grams of polyethylene per gram of supported catalyst.

Note:
The support for catalyst IC974-37-110 was found fragmented during the process of silica fluoridation. Therefore the activities presented in this table only give an indication of activity increase. They do not represent the optimal values of activities. The results in Table 3 and Table 4 provide a better indication of the activity improvement which is obtainable by the present invention.

TABLE 4

Polymerization Results

| Run No. | Catalyst Code | Weight of Catalyst (mg) | Hexene (mL) | Hydrogen (psi) | Weight of Polymer (g) | Activity (g.PE/mmolTi.[C2=]) | Productivity (g.PE/g. catalyst) |
|---|---|---|---|---|---|---|---|
| 6 | RB99-80 (comparative) | 39 | 0 | 0 | 30 | 41,225 | 769 |
| 7 | CS-1100-3-10 | 12 | 0 | 0 | 28 | 125,050 | 2333[a] |

TABLE 4-continued

Polymerization Results

| Run No. | Catalyst Code | Weight of Catalyst (mg) | Hexene (mL) | Hydrogen (psi) | Weight of Polymer (g) | Activity (g.PE/mmolTi.[C2=]) | Productivity (g.PE/g. catalyst) |
|---|---|---|---|---|---|---|---|
| 8 | CS-1100-3-10 | 11 | 5 | 0 | 51 | 269,884 | 4636[b] |

Note:
The catalyst used in this table is ($^t$Bu$_3$PN)(Indenyl)TiCl$_2$. The loading of catalyst in CS-1100-3-10 is 0.037 mmol/g. support, which is the same as the standard. The co-catalyst is PMAO-IP.
[a][b]Large temperature excursion was found in the beginning of the polymerization reaction. Molten polyethylene was found after the reactor was opened. The polymerization was too hot to run in the beginning and reliable data were not able to obtain due to the large temperature excursion. The concentration of the organometallic catalyst was decreased in order to get smooth runs and reliable data (see Table 5).

TABLE 5

Polymerization Results

| Run No. | Catalyst Code | Catalyst/Support | Cat. Loading (mmol/g sup) | Wt. of Catalyst (mg) | Hexene (mL) | H$_2$ (psi) | Wt. of Polymer (g) | Activity (g.PE/mmolTi.[C2=]) | Productivity (g.PE/g. supp) |
|---|---|---|---|---|---|---|---|---|---|
| 9 | MT-1097-11-37 (comparative) | ($^t$Bu$_3$PN)(Indenyl)TiCl$_2$/SiO$_2$ | 0.037 | 35 | 0 | 0 | 26 | 39,812 | 743 |
| 10 | CS-1100-5-11 | ($^t$Bu$_3$PN)(Indenyl)TiCl$_2$/F—SiO$_2$ | 0.019 | 10 | 0 | 0 | 29 | 302,660 | 2900[a] |
| 11 | RB99-80 (comparative) | ($^t$Bu$_3$PN)(Indenyl)TiCl$_2$/SiO$_2$ | 0.037 | 38 | 0 | 0 | 28 | 39,489 | 736 |
| 12 | MT-1097-11-35 | ($^t$Bu$_3$PN)(Cp)TiCl$_2$/F—SiO$_2$ | 0.037 | 14 | 0 | 0 | 17.3 | 66,225 | 1236 |
| 13 | CS-1100-5-11 | ($^t$Bu$_3$PN)(Indenyl)TiCl$_2$/F—SiO$_2$ | 0.019 | 11 | 5 | 0 | 62 | 638,920 | 5636 |
| 14 | MT-1097-11-34 (comparative) | ($^t$Bu$_3$PN)(Cp)TiCl$_2$/SiO$_2$ | 0.037 | 34 | 0 | 0 | 15.8 | 24,905 | 464 |
| 15 | MT-1097-11-35 | ($^t$Bu$_3$PN)(Cp)TiCl$_2$/F—SiO$_2$ | 0.037 | 21 | 5 | 0 | 89 | 246,700 | 4238 |
| 16 | CS-1100-5-11 | ($^t$Bu$_3$PN)(Indenyl)TiCl$_2$/F—SiO$_2$ | 0.019 | 9 | 0 | 0 | 22 | 255,115 | 2444 |
| 17 | CS-1100-5-11 | ($^t$Bu$_3$PN)(Indenyl)TiCl$_2$/F—SiO$_2$ | 0.019 | 10 | 5 | 10 | 10.8 | 122,425 | 1080 |
| 18 | MT-1097-11-35 | ($^t$Bu$_3$PN)(Cp)TiCl$_2$/F—SiO$_2$ | 0.037 | 13 | 5 | 10 | 11.8 | 52,837 | 907 |
| 19 | CS-1100-5-11 | ($^t$Bu$_3$PN)(Indenyl)TiCl$_2$/F—SiO$_2$ | 0.019 | 12 | 5 | 5 | 13.8 | 130,360 | 1150 |
| 20 | MT-1097-11-35 | ($^t$Bu$_3$PN)(Cp)TiCl$_2$/F—SiO$_2$ | 0.037 | 20 | 5 | 5 | 34 | 98,957 | 1700 |
| 21 | CS-1100-3-09 (comparative) | ($^t$Bu$_3$PN)(Indenyl)TiCl$_2$/F—SiO$_2$ | 0.037 | 44 | 0 | 0 | trace | — | — |
| 22 | MT-1097-22-68 (comparative) | ($^t$Bu$_3$PN)(Indenyl)TiCl$_2$/Blank SiO$_2$ | 0.037 | 25 | 0 | 0 | 22 | 47,162 | 880 |

TABLE 6

Product Information

| Run No. | Catalyst Code | Catalyst/Support | M(n) × 10$^{-3}$ | M(w) × 10$^{-3}$ | PD | Br./10$^3$ | DSC Melt Temp (° C.) |
|---|---|---|---|---|---|---|---|
| 10 | CS-1100-5-11 | ($^t$Bu$_3$PN)(Indenyl)TiCl$_2$/F—SiO$_2$ | 427 | 861 | 2.0 | ND | ND |
| 11 | RB99-80 (standard) | ($^t$Bu$_3$PN)(Indenyl)TiCl$_2$/SiO$_2$ | 192 | 520 | 2.7 | ND | ND |
| 12 | MT-1097-11-35 | ($^t$Bu$_3$PN)(Cp)TiCl$_2$/F—SiO$_2$ | 532 | 1061 | 2.0 | ND | ND |
| 13 | CS-1100-5-11 | ($^t$Bu$_3$PN)(Indenyl)TiCl$_2$/F—SiO$_2$ | 232 | 486 | 2.1 | 7 | 117.27 |
| 14 | MT-1097-11-34 | ($^t$Bu$_3$PN)(Cp)TiCl$_2$/SiO$_2$ | 168 | 765 | 4.5 | ND | ND |
| 15 | MT-1097-11-35 | ($^t$Bu$_3$PN)(Cp)TiCl$_2$/F—SiO$_2$ | 437 | 780 | 1.8 | 5.4 | 118.72 |
| 17 | CS-1100-5-11 | ($^t$Bu$_3$PN)(Indenyl)TiCl$_2$/F—SiO$_2$ | 11 | 29 | 2.6 | 18.3 | 105.6 |
| 18 | MT-1097-11-35 | ($^t$Bu$_3$PN)(Cp)TiCl$_2$/F—SiO$_2$ | 37 | 72 | 2.0 | 16.3 | 107.39 |
| 19 | CS-1100-5-11 | ($^t$Bu$_3$PN)(Indenyl)TiCl$_2$/F—SiO$_2$ | 21 | 55 | 2.6 | 16.3 | 105.64 |
| 20 | MT-1097-11-35 | ($^t$Bu$_3$PN)(Cp)TiCl$_2$/F—SiO$_2$ | 92 | 175 | 1.9 | 10.4 | 113.24 |

Note:
ND = not determined
Br/10$^3$ = short chain branches per 1000 carbon atoms The embodiments of the invention in which an exclusive property or privilege is claimed are defined as follows:

1. A supported catalyst system for olefin polymerization comprising:

a) a directly fluorided metal oxide;
b) an aluminoxane; and
c) a group 4 metal catalyst having at least one phosphinimine ligand.

2. The catalyst system according to claim 1 wherein said group 4 metal is selected from the group consisting of titanium, hafnium and zirconium.

3. The catalyst system according to claim 2 wherein said group 4 metal catalyst is defined by the formula:

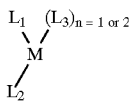

wherein $L_1$ is a phosphinimine ligand; M is selected from the group consisting of titanium, hafnium and zirconium; $L_2$ is independently selected from the group consisting of cyclopentadienyl, substituted cyclopentadienyl and heteroatom ligands, with the proviso that $L_1$ and $L_2$ may optionally be bridged together so as to form a bidentate ligand; and wherein each $L_3$ is an activatable ligand.

4. The catalyst system according to claim 3 wherein $L_2$ is selected from cyclopentadienyl and substituted cyclopentadienyl; $L_1$ is a phosphinimine ligand; n is 2 and each $L_3$ is a halide.

5. The catalyst system according to claim 1 further characterized in that said metal oxide is silica and said aluminoxane is methylaluminoxane.

6. The catalyst system according to claim 5 wherein said directly fluorided metal oxide is further characterized by containing a fluorine concentration of from 0.01 to 10 weight % fluorine.

7. The catalyst system according to claim 6 wherein said aluminoxane is present in an amount of from 1 to 40 weight % based on the combined weight of said directly fluorided metal oxide and said aluminoxane.

8. The catalyst system according to claim 7 wherein the molar ratio of aluminum contained in said aluminoxane to transition metal M is from 10:1 to 200:1.

9. A process for olefin polymerization comprising contacting at least one olefin monomer with the supported catalyst system according to claim 1 under polymerization conditions.

* * * * *